Oct. 26, 1948.  E. F. McDONALD, JR  2,452,384
AUTOMOBILE RADIO REMOTE CONTROL
Filed July 14, 1944  5 Sheets-Sheet 1

INVENTOR
EUGENE F. McDONALD, JR.
BY David M. Davis
HIS ATTORNEY

Oct. 26, 1948.　　　　　E. F. McDONALD, JR　　　2,452,384
AUTOMOBILE RADIO REMOTE CONTROL
Filed July 14, 1944　　　　　　　　　　　　5 Sheets-Sheet 2
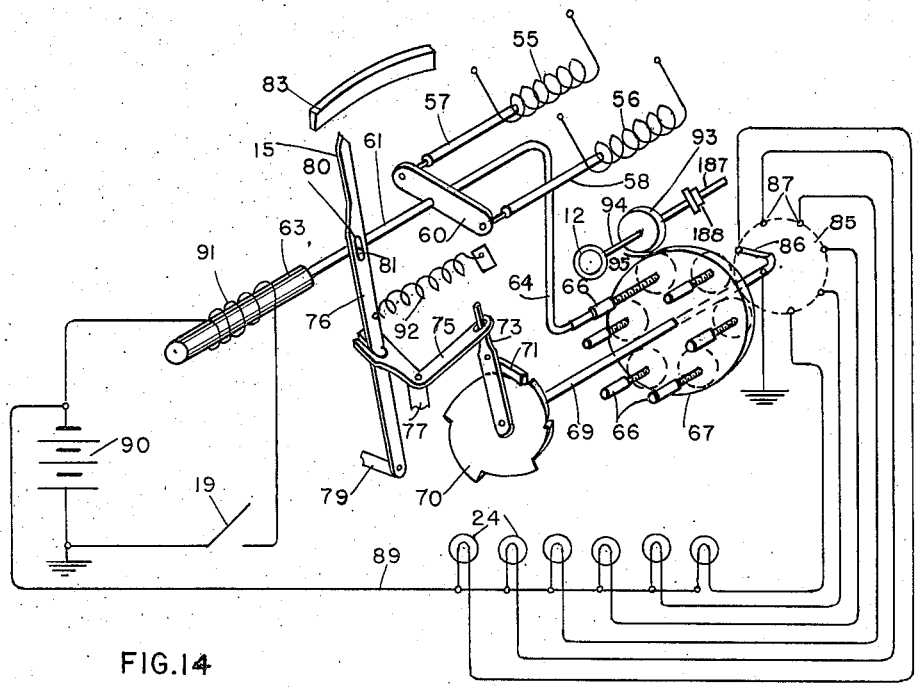
FIG. 4
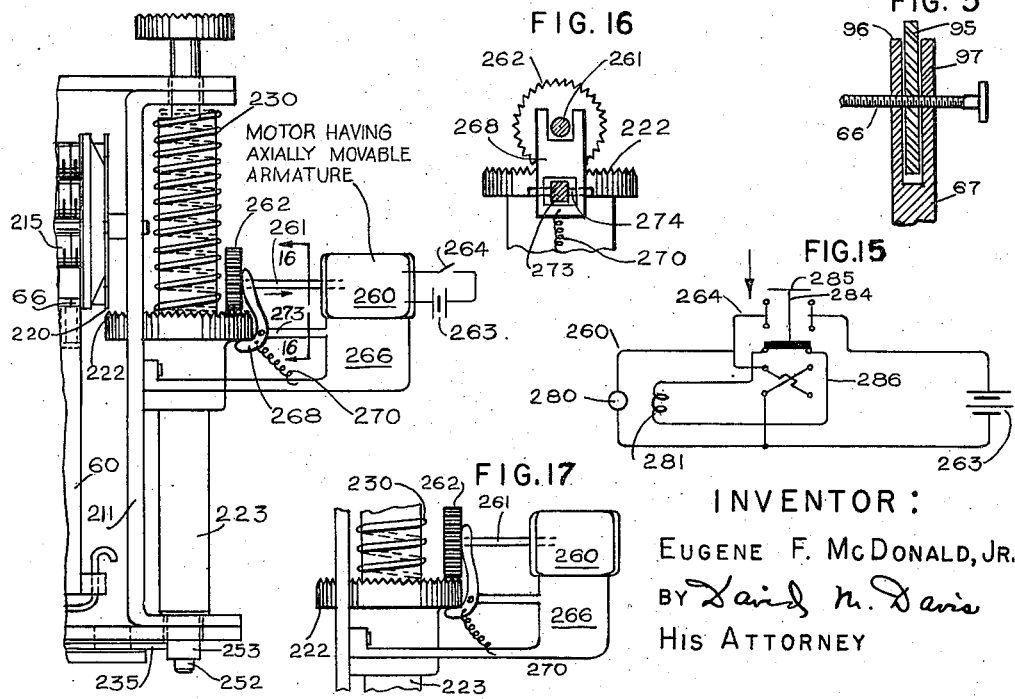
INVENTOR:
EUGENE F. McDONALD, JR.
BY David M. Davis
HIS ATTORNEY

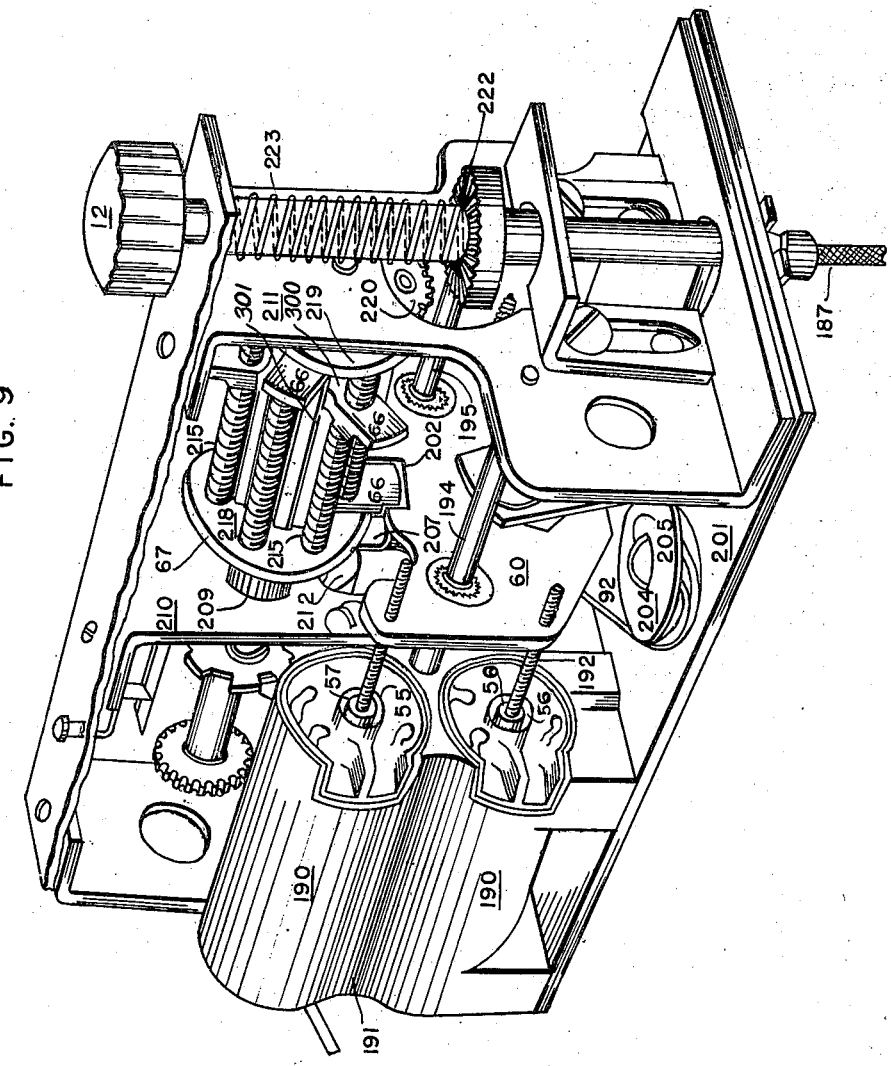

Oct. 26, 1948. E. F. McDONALD, JR 2,452,384
AUTOMOBILE RADIO REMOTE CONTROL
Filed July 14, 1944 5 Sheets-Sheet 5
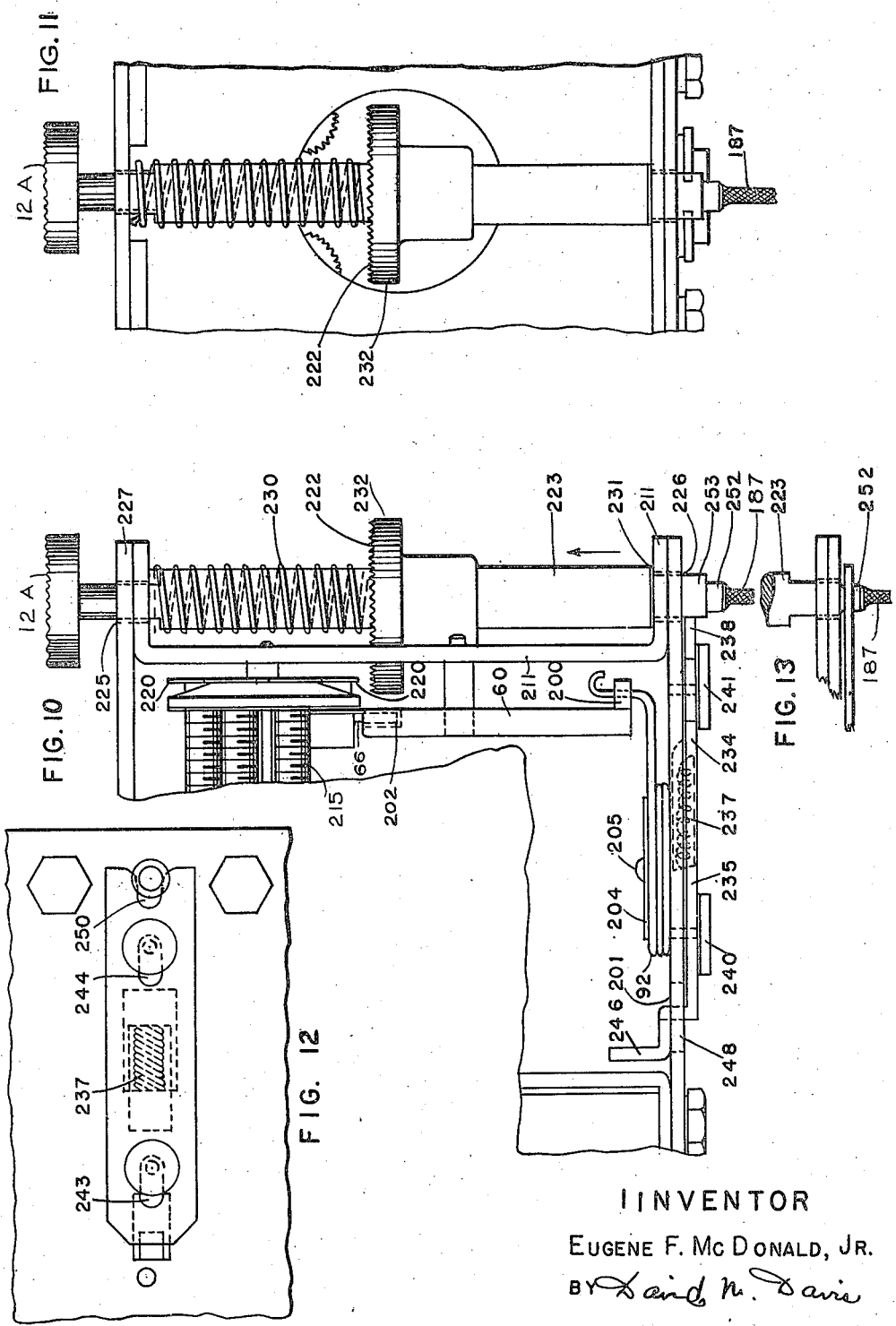
INVENTOR
EUGENE F. McDONALD, JR.
BY David N. Davis
HIS ATTORNEY Patented Oct. 26, 1948

2,452,384

UNITED STATES PATENT OFFICE 2,452,384

AUTOMOBILE RADIO REMOTE CONTROL

Eugene F. McDonald, Jr., Chicago, Ill.

Application July 14, 1944, Serial No. 544,901

13 Claims. (Cl. 250—20)

This invention relates to arrangements for controlling radio apparatus.

It is often desirable to position radio apparatus in one location and to operate or control such apparatus from some other convenient location. This is particularly true when the radio apparatus is mounted in an automobile. In such case, it is convenient to mount the radio apparatus proper in the header space, on the dashboard or in the trunk space of the automobile and to arrange the apparatus to be operated and controlled by the foot of the driver or other occupant of the automobile or to operate and control the apparatus by manipulating controls mounted on the steering post, dashboard or other part of the automobile accessible for manual control. In automobiles, it is particularly desirable that the driver should be spared the unnecessary hazards encountered when simultaneously driving the automobile and when operating or controlling the radio apparatus therein. It is desirable that the driver should at all times have both of his hands free for performing the necessary driving functions and yet have the facilities for full operation and control of radio apparatus.

In addition, the driver should have means readily accessible for muting the apparatus, for example, when and as he approaches railroad crossings, when he believes he hears fire or ambulance sirens, or when he engages in a conversation with other occupants in the automobile.

It is therefore an object of the present invention to provide in an automobile an improved unitary control operable by the driver or other occupants of the automobile for fully operating and controlling radio apparatus.

Another object of the present invention is to provide an improved unitary control for radio apparatus which is located at a point remote from the apparatus for effecting the following operations and controls: On and off operation, volume control, station changing and muting, tone control, station setup and station indicating.

A further object of the present invention is to provide an improved control system for radio apparatus in which the following operations and control may be accomplished either at the radio apparatus or at a point remote from such apparatus: On and off operation, volume control, station changing and muting, tone control, station setup and station indicating.

A further object of the present invention is to provide an improved unitary control assembly which may be located at some convenient position remote from associated radio apparatus arranged to be controlled by manipulating controls in such assembly.

Still another object of the present invention is to provide improved tuning apparatus especially adapted for use in compact radio equipment such as marine, aircraft and automobile radio equipment, etc., wherein it is convenient to locate the apparatus at one position and operate and control the apparatus from another position.

The features of the present invention which are believed to be novel are set forth with particularity in the appended claims. This invention itself, both as to its organization and manner of operation, together with further objects and advantages thereof, may best be understood by reference to the following description taken in connection with the accompanying drawings in which:

Fig. 4 shows apparatus, partly in diagrammatic form, of apparatus for achieving certain features of the present invention;

Fig. 5 shows a sectional view through a portion of the apparatus shown in Fig. 4;

Fig. 9 shows a view in perspective of a practical embodiment of apparatus shown partly in schematic form in Fig. 6 for achieving features of the present invention;

Figs. 10 through 13 show certain structural details of the apparatus shown in Fig. 9, Fig. 13 showing the apparatus in Fig. 10 in a different operating position;

Fig. 14 shows a view in elevation of modified apparatus for achieving certain features of the present invention;

Fig. 15 shows in greater detail features of the electrical control circuit shown in Fig. 14;

Fig. 16 is a sectional view taken substantially on line 16—16 of Fig. 14;

Fig. 17 shows a view in elevation of parts of apparatus of Fig. 14 in a different operating position;

Figure 1:
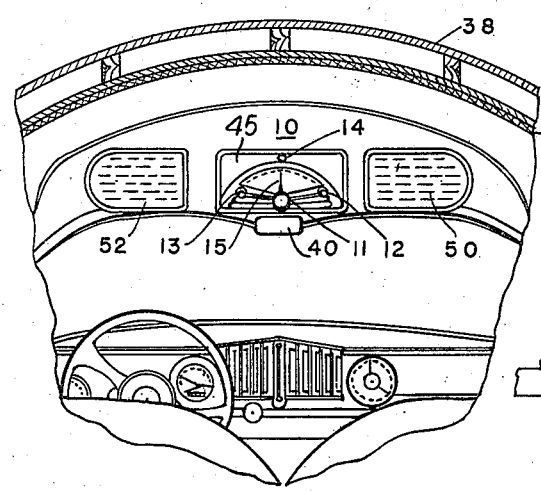

A radio receiver arranged to be controlled in accordance with the present invention is preferably mounted in the header space of an automobile as shown in Fig. 1. The receiver is preferably controlled not only at its location at the header space but also by the foot of the driver of an automobile with the arrangement shown in Fig. 2. The composite receiver may be mounted on a header plate 10.

At the header space, the set may be energized and deenergized by turning knob 11, tuning of the receiver may be effected by turning knob 12, volume output control of the receiver may be effected by turning knob 13, and control the tone of signals reproduced by the receiver may be effected by turning knob 14. Pointer 15 at the header space indicates the tuned condition of the receiver.

The driver of an automobile, by actuating foot controls mounted on floorboard 16 (Fig. 2) of an automobile, may mute the receiver, tune the receiver to predetermined stations, energize and deenergize the receiver, adjust the tone of sound from the receiver, and change the predetermined stations to which the receiver may be tuned. Furthermore, means are present on the floorboard for indicating a station to which the receiver is tuned.

The controls for effecting and indicating the above mentioned operations at the floorboard are preferably mounted on a unitary structure 17 arranged to be mounted on the floorboard of an automobile and within reach of the driver's foot for convenient operation thereby when the driver's attention is required in the normal course of driving an automobile.

The unitary control member structure has mounted thereon an on-off control 18, a muting and station changing switch 19, a tone control switch 20, a station setup control 21 and a series of consecutively numbered apertures 22 formed therein. which apertures are illuminated by illuminating means 24 (Fig. 6) within the structure for indicating the tuned condition of the receiver. The receiver 45 (Fig. 1) is preferably located in the header space and is electrically connected to control elements in the unitary structure by wires in cable 27 extending between the structure 17 and the receiver 45.

Figure 2:
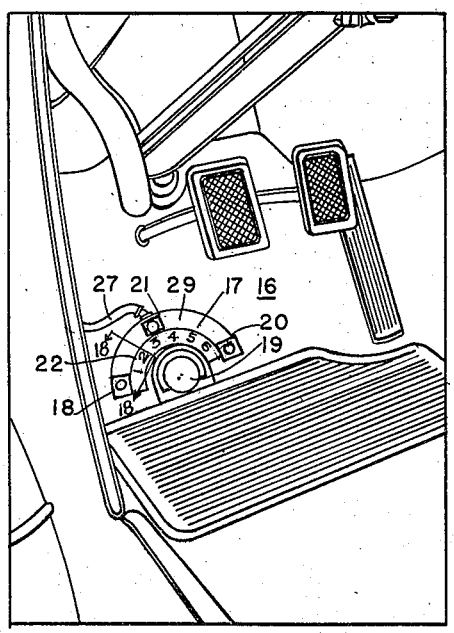
Figures 1 through 3 show apparatus embodying the present invention.

As shown in Fig. 2, the unitary control member structure has preferably a crescent-shaped portion 29 with a push button type on-off switch 18 mounted thereon at one end of the crescent and with a push button tone control switch 20 on the other end of the crescent portion 29 and with a station setup control 21 mounted in the center of the crescent portion, the crescent shaped portion 29 being formed in part of transparent material 23 behind which a series of lights 24 are disposed to transmit light through adjacent portions thereof having different markings thereon. Light obscuring members 25 (Fig. 18) disposed on opposite sides of each light source 24 assure light transmission only through the transparent portion having a marking corresponding to the particular source 24 which is energized in accordance with the tuned condition of the receiver, as will be described later.

Figure 18:
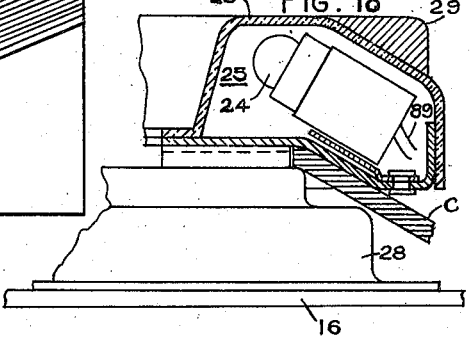
Fig. 18 shows a sectional view taken substantially on line 18—18 of Fig. 2.
Figure 19:
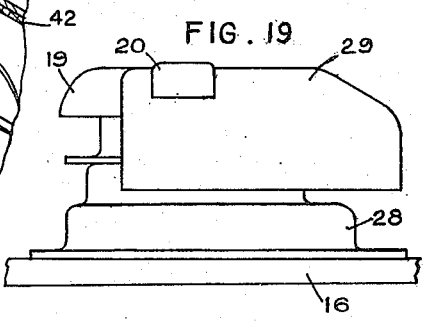
Fig. 19 shows a side elevational view of certain elements shown in Fig. 2.

The crescent-shaped member 29 and structure including footswitch 19, as shown in Figs. 18 and 19, are rigidly mounted on a common supporting member 28 which, in turn, is mounted on the floorboard 16 of the automobile with a portion of the automobile floor carpet C disposed between the crescent-shaped member 29 and supporting structure 28 for covering the supporting structure 28 and floorboard 16. The station changing and muting switch 19 is preferably, as shown in Fig. 2, mounted in fixed relationship to and within the space defined by crescent-like member 29.

Figure 3:
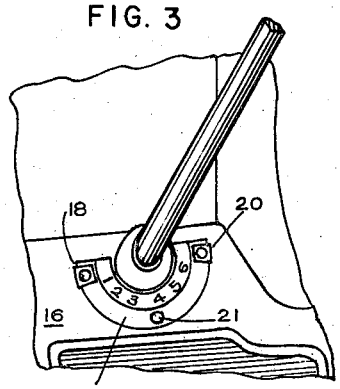
Figure 6:
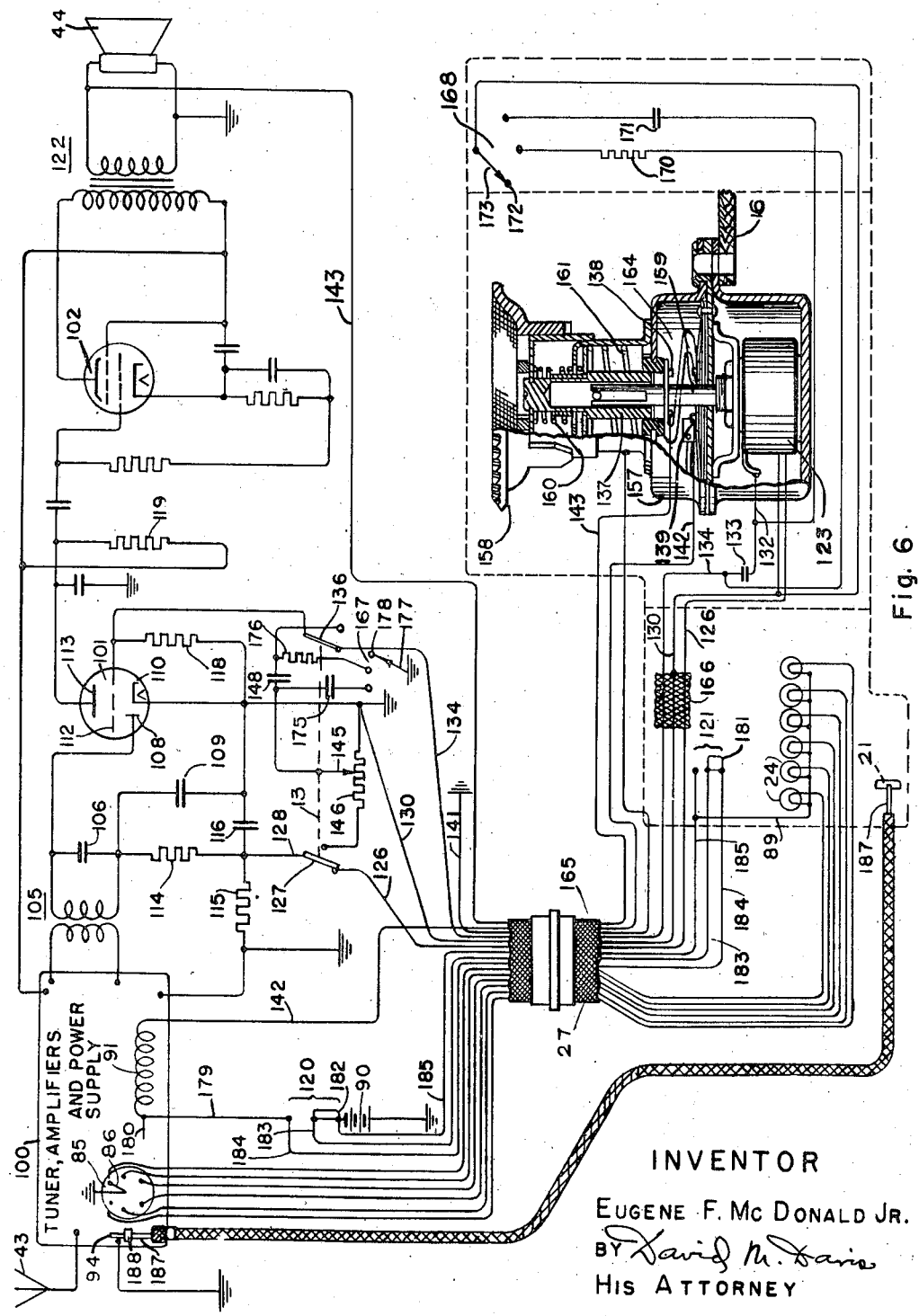
Fig. 6 shows constructional features and electrical circuit connections for achieving certain features of the present invention.

Alternatively, in accordance with this invention, as shown in the modification in Fig. 3, the crescent-shaped member 29 may be mounted around and contiguous to the steering post of an automobile with the steering post extending through the concave portion defined by the crescent-shaped member 29, and with the station indicating numerals on member 29 inverted. In such case, the station changing and muting switch 19 is located at some other convenient place in the automobile, such as on the floorboard 16, as shown in Figs. 2 and 6, or on the steering post or on the dashboard of the automobile, but it is preferred to mount the station changing and muting switch 19 on the floorboard.

Referring to Fig. 1, the header enclosure member or plate 10 extends substantially the full width of an automobile, upon which plate is fixedly mounted a complete radio receiver placed between the metal roof 38 and header plate 10. The space which the radio reciver occupies in that figure is usually called the header space and in the conventional present-day automobile is the space defined by the roof of the automobile and decorative felt or cloth directly in front of a person when he is sitting in the driver's seat. The radio receiver and its supporting means 10 are positioned in the header space so as to give a pleasing appearance without sacrificing the space normally required for a conventional rear vision mirror 40.

Although it is preferred to mount the radio receiver in the header space, the receiver may be mounted elsewhere in the space normally defined by the roof 38 of the automobile and decorative cloth or felt 42 without projecting unduly far from the surface defined by the decorative felt, as shown in the copending application of Otto E. Wagenknecht, Serial No. 503,878, filed September 27, 1943, now abandoned.

As is shown in Fig. 1, the main operating elements of the radio receiver are mounted with on-off control 11, manual tuning means 12, volume control means 13 and tone control means 14 projecting through plate 10 upon which the receiver unit is mounted. The tuning means 12, volume control means 13, on-off control 11 and tone control means 14 are preferably disposed near the center of the automobile so as to be equally available to occupants of the front seat of said automobile.

Plate 10, preferably of pleasing appearance, has a set of openings 50 which readily allow the passage of sound waves into the car from the front part of the speaker 44 mounted on plate 10 directly behind openings 50. A set of openings 52 through the left-hand side of plate 10 in Fig. 1 is symmetrically located with respect to the other set of openings 50 about an axis passing through the longitudinal center line of the car. Since the header enclosure member or plate 10 closes off completely the space within which the speaker 44 is located, it is desirable to provide openings 52 in plate 10 so that a listener may hear sound waves from the rear side of the speaker 44 as well as from the front side for enhanced tone quality. In some instances it has been found desirable to close up the openings 52 for optimum tone quality without altering substantially the general outer appearance of plate 10.

Figure 4 is a functional representation of a possible tuner structure embodying the present invention, as is practically exemplified by the structure of Figure 10.

In Figure 4, briefly, the closing of footswitch 4 closes the electrical path through solenoid 91, and causes plunger 63 to be attracted toward solenoid 91 against the force of a spring 92. The turret rotating mechanism is cocked during this process and on the return stroke of plunger 63, when switch 19 is open, turret 67 is rotated bringing a subsequent stop member into position to engage the carriage 60. The magnitude of the inductance of coils 55 and 56 is readjusted for a different station by this process.

Each of the stops 66 may be mechanically preset through appropriate cooperating mechanical linkages by adjustment of control 12 or by remote adjustment of shaft 187, which acts through a clutch including element 188. These elements and their functions are described in detail in connection with the practical embodiment shown in Figure 9.

In addition to serving as a manual tuning means, the knob 12 may be turned to adjust the position of the other stop members 66 in turret 67 so that the stop members 66 may be in suitable position for tuning when the footswitch 19 is actuated.

In Fig. 6, the radio receiver arranged to be installed in the automobile or vehicle includes an antenna 43, the tuner and amplifiers represented by a rectangle 100, an electron discharge device 101 arranged to detect and amplify signals received by the antenna 43 and tuned and amplified by the tuner and amplifier 100, a power amplifier discharge device 102, and a speaker 44. The operation of the radio receiver is normal insofar as it successively receives a modulated carrier wave from the antenna 43, tunes and amplifies such wave in the tuner and amplifier 100, detects the signal in accordance with which the carrier wave is modulated, such detection being carried out in the circuits associated with the discharge device 101, amplifies such signals through devices 101 and 102, and reproduces the signal in speaker 44.

The signal detection circuit associated with the discharge device 101 includes a high frequency transformer 105 whose primary winding is energized by the amplified carrier wave from the tuner and amplifier 100, the secondary of transformer 105 being tuned to resonance at the frequency of such carrier wave by a condenser 106. One terminal of the secondary of transformer 105 is connected to the anode 108 of a diode section of the electron discharge device 101 and the other terminal is connected for high frequency current through a condenser 109 to the cathode 110 of the device 101, which cathode is associated with the diode section including anode 108, and with a triode section including a control electrode 112 and an anode 113. To complete a path for continuous current through the anode 108, the cathode 110 is grounded, and that terminal of the secondary of the transformer 105 which is connected to the condenser 109 is grounded through two serially connected resistances 114 and 115. A point between resistances 114 and 115 is connected to ground and to the cathode 110 through a high frequency by-passing condenser 116, whereby signals detected in the detection circuit appear across the resistance 115.

The signal across the resistance 115 is transferred through either of two circuits to be described hereinafter to the control electrode 112 of discharge device 101. This control electrode 112 is connected through a suitable grid resistance 118 to the cathode 110. The anode 113 is connected through a suitable load resistance 119 to a source of positive potential illustrated schematically by the rectangle 100, which source of positive potential is applied with power through either switch 120 or through switch 121 from battery 90 which may be the storage battery of the vehicle.

Amplified signal potentials appearing across the load resistance 119 are amplified through the power amplifier discharge device 102, which is connected in usual fashion, and such amplified signals are transferred through an output transformer 122, the secondary of which is connected to energize the speaker 44.

One circuit for transferring signals from the resistance 115 to the control electrode 112 includes a volume control resistance 123, which is embodied in a unit of the type shown in my U. S. Patent No. 2,374,873, dated May 1, 1945, suitable for preferably mounting near the feet of an operator of a vehicle in which the receiver is mounted. The ungrounded terminal (upper terminal in Fig. 6) of the resistance 123 is connected through conductor 126 through a switch 127, conductor 128, to one terminal of resistance 115. The other terminal of resistance 123 is connected through conductors 130 to ground. This ground is preferably the chassis of the receiver at a point near the points where cathode 110 and one terminal of resistance 115 are grounded. To ground a terminal of the resistance 115 in any other place would make it possible for extraneous voltage between such ground point and the chassis of the receiver to produce undesirable current flow through resistance 115, which would result in undesirable noise being produced in speaker 44.

The movable contact 131 of the volume control resistance 123 is connected through a conductor 132, condenser 133, conductors 134 and a switch 136 to the control electrode 112. By such connections, signal voltage appearing across the resistance 115 appears also across the volume control resistance 123, so that any desired portion of this signal voltage across resistance 123 may be impressed through movable contact 131 upon control electrode 112, thereby controlling the output of speaker 44. Suitable means are provided, as described hereinafter, to control the position of the movable contact 131 by a foot operation of the vehicle's driver.

In the unit including the foot operated volume control resistance 123 of the type shown in my above mentioned patent application, there is also provided means operable by the foot of the vehicle's driver for silencing the speaker 44 and for changing the tuning adjustment of the turner represented by rectangle 100. This means includes a switch contact 137, movable by the foot of the vehicle's driver, a second switch contact 138, movable when engaged with contact 137, and a third, fixed, switch contact 139. The contact 137 is connected through conductors 141 to ground. The contact 139 is connected to switch 120 through conductors 142, and the operating solenoid 91, suitably arranged as described heretofore for changing the tuning adjustment of tuner 100, and conductor 179. The contact 138 is connected through conductors 143 to one terminal of the secondary of output transformer 122. The other terminal of the secondary of transformer 122 is grounded.

In operation the driver of the vehicle in which this receiver is installed may at will control the output volume of the receiver by moving by a foot operation the movable contact 131 of the resistance 123, or he may depress the movable switch contact 137 until it touches contact 138, at which time a short circuit is placed across the secondary of output transformer 122, thereby instantaneously silencing the speaker 44. Such silencing is frequently desirable to allow conversation or to listen for train whistles at railroad crossings.

Further depression of the switch contact 137, so that it carries movable contact 138 with it to complete the circuit between the contacts 138 and 139, defining switch 19, energizes the operating coil 91 from battery 90, so long as "two-way" switch 11 or "two-way" switch 18 is in a position to connect the ungrounded terminal of battery 90 to the left-hand terminal of coil 91 in Fig. 6 to change the tuning adjustment of the tuner represented by the rectangle 100 so as to receive a different pretuned station.

Switches 127 and 136, as well as the movable contact 145 of a volume control resistance 146, are mechanically arranged to be controlled by operation of a single operating element, preferably so positioned that it may be operated by an occupant of a vehicle other than the driver, and preferably so located that it also may be operated by the driver. This single operating element is controlled by the control knob 13 (Fig. 1).

Upon initial movement of this operating element, to be more fully described hereinafter, from one extreme position, a slight movement of this operating element 13 is effective to change the positions of switches 127 and 136, so as to disconnect the upper terminal of resistance 123 in unit 124 from resistance 115, and to isolate the movable contact 131 which is connected to lead 134 through condenser 133 from grid 112 of device 101. The movement of switch element 127 simultaneously connects volume control resistance 146 in parallel with resistance 115, and the movement of switch 136 simultaneously connects the movable contact 145 of volume control resistance 146 through condenser 148 to the control electrode 112.

Figures 7, 8:
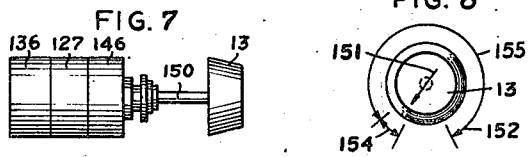
Fig. 7 shows a view in elevation of apparatus useful for achieving purposes of the present invention.
Fig. 8 shows diagrammatically operating characteristics of the apparatus shown in Fig. 7.

In Fig. 7, there is shown a side view of such an operating element, comprising a knob 13 which may suitably be turned by hand. This knob 13 is arranged to turn a shaft 150 on which is mounted the volume control resistance 146 and switches 127 and 136. This unit may conveniently be so mounted that knob 13 is on the header plate 10 of the vehicle in which the receiver is mounted, so that it may conveniently be operated by the driver of the vehicle or by a passenger.

In Fig. 8, there is shown an end view of this assembly in which an arrow 151 on the face of the knob 13 may be seen. When the knob 13 is turned in a clockwise direction, as indicated by the arrow 152, its initial movement mentioned heretofore, which is effective only to close the switches 127 and 136, covers an angle 154. Subsequent movement of the knob 13 is effective to change the setting of the variable contact 145 on the volume control resistance 146, so as to apply any desired portion of the signal potential across resistance 146 between the control electrode 112 and cathode 110.

The volume control resistance 146 may be of a usual type in which rotation through a suitable angle at one end of the total angle through which it may be operated is effective to change the resistance to a very slight degree, if at all. Angle 154 should be at such end of the total angle of movement of knob 13. All, or by far the major part, of the resistance change in resistance 146 occurs during rotation of the knob 13 through the angle 155.

The switches 127 and 136 may conveniently be of the type termed in the art "switch covers," which are so arranged that they may be fitted on the back of volume control resistance 146, of usual form, and are actuated during rotation of the shaft 150 of the volume control resistance through a desired part of its angular movement.

The modification of unit 124 is fully described and claimed in applicant's U. S. Patent No. 2,374,873 dated May 1, 1945, for radio control system and multiple circuit switch. Briefly, the casing 157 of this unit is so arranged that it may be conveniently placed alone on the floorboard of the automobile, or preferably mounted within the concave portion defined by crescent member 29 (Fig. 2) and fastened thereto so that the crescent member 29 and casing 157 are integrally formed for all practical purposes. A foot button 158 on the top of casing 157 is arranged so that it may be either depressed or rotated with respect to the casing 157. Rotation of the button 137 by the foot of the vehicle's operator is effective to vary the vehicle control resistance 123. Depression of the button 158 by the foot of the vehicle's operator is effective first to compress a relatively weak spring 160 and complete a connection between the grounded contact 137 of the foot button 158 and the movable contact 138, both of which are illustrated schematically in Fig. 1. Further depression of the foot button 158 is effective to compress the relatively stronger spring 161 and, while maintaining a connection between the grounded movable contact 137 and movable contact 138, moves both of these contacts down, so that connection is made between the movable contact 138 and the fixed contact 139, which are all schematically illustrated in Fig. 6.

The conductors 141, shown in Fig. 6 as being connected between movable switch contact 137 and ground, are preferably a shielding braid like that around the cabled conductors which, as shown in Fig. 6, are passed through the shielding braid constituting the metal cable sheath 165. It is also desirable that conductors carrying audio frequency and extending from the control unit 124 to the receiver be encased in a separate shielded cable 166 (Fig. 6) whose metal sheath is grounded, such metal sheath being included within sheath 165. In such case, external electrostatic and electromagnetic fields do not introduce undesirable voltages into conductors attached to the volume control resistance 123. Introduction of such undesirable voltage into conductors connected to resistance 123 results in the production of noise in the speaker 44 which interferes with proper reproduction of signals.

Other arrangements for effecting station changing, muting and volume control by means of a footswitch are shown and described in applicant's U. S. Patent No. 2,445,031.

Referring to Fig. 6, an arrangement is shown for controlling at the header plate 10 or on the floorboard of an automobile the tone of signals reproduced by the receiver mounted in the header space of an automobile. A three position tone control switch 167 mounted in the header space and having control knob 14 (Fig. 1) is effective to control the tone of signals when the receiver is conditioned for operation at the header space by moving the switch elements 127 and 136 to their right-hand positions in Fig. 6. When such switch elements 127 and 136 are actuated to their positions shown in Fig. 6, the three position tone control switch 168 may then be moved to one of its three positions for tone selection.

The tone control switch 168 is effective to connect either resistance 170 or condenser 171 in an audio frequency circuit for controlling tone. Resistance 170 has one of its terminals connected to a first terminal on switch 168 and its other terminal connected to lead 134. Condenser 171 has one of its terminals connected to a second terminal of switch 168 and its other terminal connected to the movable contact 131 of resistance 123. The third terminal 172 of switch 168 is isolated and the movable arm 173 of switch 168 is connected to the grounded lead 130. When arm 173 is connected to condenser 171 some of the high frequency components of the audio signal reproduced in speaker 44 is suppressed. When arm 173 is connected to resistance 170 some of the low frequency components of the audio frequency signal reproduced in speaker 44 is suppressed and when arm 173 is in its third position engaging contact 172 neither some of the high nor some of the low frequency components reproduced in speaker 44 is suppressed. This tone control may be effected only when switches 127 and 136 are in the position shown in Fig. 6, but when such switches 127 and 136 are each simultaneously in the other position the tone control switch 167 operated by knob 14 at the header space is effective to alter the tone of signals reproduced in speaker 44.

Tone control condenser 175 has one of its terminals connected to a first contact of switch 167 and its other terminal connected to the movable contact 145 of resistance 146. Tone control resistance 176 has one of its terminals connected to a second contact of switch 167 and its other terminal connected to control grid 112 through switch 136. The third contact 178 is isolated and the grounded arm 177 of switch 167 is arranged to make contact with the three mentioned contacts of switch 167.

With switches 127 and 136 each simultaneously in their other position to the right in Fig. 6, and arm 177 connected to resistance 176, some of the low frequency notes reproduced in speaker 44 are suppressed. When arm 177 is connected to condenser 175, some of the high frequency notes reproduced in speaker 44 are suppressed. When arm 177 is on contact 178, neither some of the low frequency notes nor some of the high frequency notes reproduced in speaker 44 are substantially suppressed. It is thus clear that means are provided for controlling the tone of signals reproduced in speaker 44 at either the header space or on the floorboard of the automobile.

The receiver may be turned on and off either at the header space by manipulating knob 11 (Fig. 1) at the header space so as to actuate "two-way" switch 120 (Fig. 6) or be turned on and off at the floorboard of the vehicle by manipulating control 18 (Fig. 2) so as to actuate switch 121 (Fig. 6). That is, in Fig. 6 the switches 120 and 121 are of the type commonly referred to in the art as "two-way switches" which are connected so that either one is effective to connect or disconnect the ungrounded lead of source 90 with lead 179 which conducts current not only to solenoid 91 when conductor 142 is grounded but also to the receiver proper through lead 180. Switch arms 181 and 182, respectively, of switches 120 and 121 are permanently connected through conductor 183. Corresponding contacts on switches 120 and 121 are connected by conductors 184 and 185, conductor 184 being connected to lead 179 and conductor 185 being connected to the ungrounded terminal of source 90. Thus, the switches 120 and 121 are effective to turn on and off the receiver either at the header space or at the floorboard of the vehicle.

Referring to Fig. 6, the station indicating lamps 24 are connected in the manner shown in Fig. 4, one common terminal of such lamps being connected through lead 89 to the ungrounded terminal of source 90 and each of the other terminals on each lamp being connected through separate leads to a corresponding contact of switching device 85 having the grounded movable contact arm 86.

It is understood that the footswitch 19 shown diagrammatically in Fig. 4 may be actuated to tune the receiver to predetermined broadcast stations from a remote point. An arrangement for "setting up" such predetermined broadcast stations or for tuning the receiver continuously over a band of frequencies at a remote point is described now.

Referring to Figs. 4 and 6, a flexible shaft 187 is releasably connected to an extension of shaft 94 through a releasable connection 188. Such connection 188 may, for example, be of the type which requires movement of flexible shaft 187 in a direction parallel to its axis and in the direction of shaft 94 for operatively connecting shaft 187 with shaft 94 such that subsequent rotation of shaft 187 causes rotation of shaft 94. As shown in Fig. 6, the flexible shaft 187 extends from the header space to the floorboard of the automobile where control knob 21 fastened to one end thereof may be moved to the left (Fig. 6) to cause shaft 187 to engage shaft 94 and then rotated to change the tuned condition of the receiver.

The station setup or means for continuously tuning the receiver from a remote point such as the floorboard may take other forms than that shown and described.

Fig. 9 shows a practical embodiment of the tuning arrangement shown in Figs. 4 and 6. Certain details of such tuning arrangement are fully described and claimed in the copending application of Otto E. Wagenknecht, Serial No. 516,362, filed December 31, 1943. In accordance with the present invention, this type of tuner is made effective not only to "set up," at the location of such tuner, predetermined stations to which the tuner may subsequently be sequentially tuned but also to "set up" at a distant place, such as the floorboard or the trunk space of an automobile, the broadcast stations which may subsequently be tuned in a sequential manner by sequential operation of a footswitch or the like. Furthermore, such "set up" means located at such remote point may also be used to provide continuous tuning control over a frequency band.

Fig. 9 shows practical apparatus for adjusting or varying the position of each one of the powdered iron cores or slugs 57, 58 with respect to associated inductance coils 55, 56 encased in and electrically insulated from metal cylinders 190, which cylinders are joined by a metallic web 191.

The apparatus is effective to position the core members 57, 58 with respect to their associated coils so that those core members assume predetermined positions with respect to their associated coils 55, 56 when the radio receiver is automatically tuned by operating a push button, footswitch or similar device. Furthermore, the apparatus in Fig. 9 is effective to produce a continuous movement of the core members 57, 58 with respect to their associated coils when it is desired to tune the radio received continuously through a given frequency band either at the location of such tuner or at a remote point.

In Fig. 9, the core members 57, 58 are preferably adjustably mounted on carriage member 60 by means of a flexible coil spring-like member 192 which has one end fastened in a core member and is adjustably held in carriage 60 by the screw-threadlike portion of the spring member 192 engaging a cooperating screw-threaded portion in carriage 60.

The movable carriage 60 carries core members 57, 58 and its position determines the position of the core members in their associated inductance coils, the carriage 60 being slidably mounted on guide members 194 and 195 which pass through cooperating guide apertures in the carriage 60. Carriage 60 is normally biased to the right in Fig. 9 against the most downward positioned one of the angularly spaced stop members 66 by means of a prestressed spring 92 having one of its ends (Fig. 10) fastened to the carriage extension 200, and its other end fixed relative to the base plate 201. Carriage 60 is provided with a recessed portion 202 arranged to snugly receive a stop member 66 for increasing the reset accuracy of carriage 60 in repeated operation of the tuning device.

Spring 92 is confined between the base plate 201 and a circular member 204, the spring 92 being wound and prestressed around the bolt 205 which has one end threaded in base plate 201, and which has circular member 204 attached on its other end by means, for example, of a press fit. The particular spring 92 shown in Fig. 9 is used advantageously because it occupies a very limited space and the force exerted thereby is relatively constant over the length of the travel of carriage 60 from abutting relationship with the turret actuating member 207 (similar to member 76 in Fig. 4) to abutting relationship with the most downward one of the stops 66 on turret 67.

Movement of carriage 60 to the left in Fig. 9 on guides 194 and 195 against the action of spring 92 to abutting relationship with turret actuating member 207 is accomplished by energizing a solenoid 91 (Fig. 4) disposed with its longitudinal axis parallel to and spaced midway between the extension of the axes of guide members 194 and 195 such that when iron core 63 (Fig. 4) attached to carriage 60 is attracted by the magnetic force set up by the solenoid 91, carriage 60 moves to the left in Fig. 1 on guide members 194 and 195 without much friction but against the action of spring 92.

As long as solenoid 91 is energized, carriage 60 remains in its furthermost left position in Fig. 9, but when solenoid 91 is deenergized the carriage 60 moves to the right on guides 194 and 195 under the influence of restoring spring 92 until carriage movement to the right is arrested by one of the stop members 66 on turret 67.

In the furthermost right position of carriage 60 in Fig. 9, after it returns from engagement with turret actuating member 207, another stop member 66 is engaged which, of course, determines the rest position of carriage 60 and determines the position of core members 57 and 58 in their associated inductance coils 55 and 56. The means for causing another stop member 66 to arrest the travel of carriage 60 is described in connection with the description of Fig. 4 and in more detail in the above mentioned application of Otto E. Wagenknecht.

In general, when carriage 60 moves to the left in Fig. 9 and approaches the end of its travel, it engages the turret actuating member 207 and then moves it from its normal position shown in Fig. 9 to a more rearward position during which movement the turret actuating mechanism is conditioned to rotate the turret shaft 209 and turret 67 an angular distance corresponding to the angular distance between adjacent stops 66. As carriage 60 moves from its furthermost left position near the position shown in Fig. 9, the turret shaft 209 and mechanically connected turrest 67 are rotated an angular distance equal to the angular distance between stops 66 so that movement of carriage 60 is arrested by a stop adjacent to the one which previously arrested the movement of carriage 60.

In Fig. 9, the turret 67 carrying the adjustable stops 66 and having its shaft 209 extending substantially the full length of the composite device is journaled respectively in the vertically extending and supporting plates 210 and 211, the plates 210 and 211 being suitably secured to the base plate 201 by means of screw connections or the like. Turret shaft 209 is arranged to be rotated intermittently and only clockwise in Fig. 9 an angular distance corresponding to the angular distance between adjacent stops 66 each time carriage 60 moves to its furthermost left position in Fig. 9 and then returns substantially to its initial position.

Suitable movement of member 207 for intermittently turning shaft 209 is produced by linear back-and-forth movement of turret actuating member 207, such back movement being produced by engagement of carriage 60 with member 207 and such forth movement being produced by the action of a restoring spring (not shown). Such back-and-forth movement of member 207 causes respectively counterclockwise and clockwise movement of a gear train suitably connected to turret shaft 209.

That is, linear movement of actuating member 207 is transformed into suitable rotary movement of shaft 209 by providing actuating member 207 with a suitably twisted portion 212 along its axial length and by providing a suitable curved aperture in a rotatable gear (not shown) through which twisted portion 212 passes in cooperating engagement.

With the apparatus thus far described it is evident that, each time actuating solenoid 91 (Fig. 4) is energized, the carriage 60 moves against the action of spring 92 from engagement with one stop member 66 to abutting and operating engagement with turret actuating member 207 so as to condition the turret actuating mechanisim for rotating the turret 67, and that when the actuating solenoid 91 is deenergized the carriage 60 moves under the influence of restoring spring 92, the turret 67 revolves an angular distance corresponding to the angular distance between adjacent stops 66 and further movement of the carriage is arrested by an adjacent stop 66.

Each stop member 66 is adjustably mounted on individual screw-threaded shafts 215 which lie in a direction substantially parallel to the axes of inductance coils 55 and 56 and is displaced from adjacent stop members by equal angles of 30° in the particular device shown in Fig. 9. Rotation of screw-threaded shaft 215 causes linear movement of the associated stop members carried thereon, the particular stop member 66 being guided and held from rotation by the cooperation of an extension 300 on such stop cooperating with a groove 301 in turret shaft 209 extending the full length of adjustable stop travel.

Each screw-threaded stop positioning or bearing shaft 215 is journaled at its opposite ends in spaced flanges 218 and 219 fixed on turret shaft 209, one end of each such positioning shaft 215 carrying a gear 220 fixed thereto and arranged to be engaged by a gear 222 of an actuating mechanism to be described now for adjusting or varying the position of a stop 66 on its associated screw-threaded shaft 215.

In Figs. 9 to 13, inclusive, rod 223 having actuating gear 222 integrally formed thereon and movable in a direction parallel to its axis in cylindrical guide openings 225 and 226, respectively, in the top plate 227, base plate 201 and supporting member 211 is normally biased downward in Fig. 10 by prestressed compression spring 230 with shoulder 231 of rod 223 in engagement with the curved extension of supporting plate 211, the spring 230 having one of its ends abutting top plate 227 and its other end abutting the shoulder 232 having gear 222 thereon.

When control rod 223 is moved upward in the direction of the arrow in Fig. 10, gear 222 engages the most downward one of the gears 220 on its associated rod 215 so that a stop member 66 carried on such rod 215 is moved along the rod 215 by rotating control rod 223 with gear 222 in engagement with gear 220. Rod 223 and gear 222 are maintained in their engaging position with gear 220 by a latch mechanism 234 described now.

The latch mechanism 234 for holding gear 222 in engagement with gear 220 comprises a latch bar 235 slidably mounted and guided on base plate 201 with a spring 237 for biasing the end 238 of bar 235 into engagement with the projecting end of manual control rod 223, the compression spring 237 having one of its ends abutting a recessed portion of base plate 201 and its other end abutting a recessed portion in bar 235 so as to tend to push bar 235 to the right in Fig. 10.

The bar 235 is slidably mounted and guided on base plate 201 by pins 240 and 241 respectively passing through latch bar apertures 243 and 244 and having one of their ends anchored in base plate 201, the other ends of pins 240 and 241 carrying enlarged heads for maintaining latch bar 235 on the plate 201. A projecting portion 246 of latch bar 235 extends upward through an aperture 248 in base plate 201 in the path of carriage 60 for moving latch bar 235 to the left in Fig. 10 each time solenoid 91 (Fig. 4) is energized whereby end 246 of latch bar 235 disengages manual control rod 223.

Control rod 223 is latched into operative position with one of the gears 220 by moving it in the direction of the arrow in Fig. 10, in which case the spring-pressed latch bar 235 having opening 250 of slightly larger diameter than the diameter of control rod portion 252 engages such portion and enlarged portion 253 as shown in Fig. 13 so as to hold the manual control rod 223 in its most upward position in Fig. 10 in engagement with gear 220 and against the action of compression spring 230. Then, when carriage 60 is moved to its furthermost left position in Fig. 10 by energizing solenoid winding 91 (Fig. 4), carriage 60 abuts latch bar projection 246 (Fig. 10) and moves the latch bar end 238 out of engagement with the reduced portion 252 whereupon the control rod 223 moves downward in Fig. 10 due to the action of compression spring 230. When and as carriage 60 moves from its furthermost left position in Fig. 9, latch bar end 238 engages the enlarged portion 253 of manual control rod 223 and movement of latch bar 235 is thereby limited, such return movement of latch bar end 238 being due to the action of compression spring 237.

Control rod 223 having actuating gear 222 formed integrally therewith may be moved from the position shown in Fig. 10 to a position corresponding to the position shown in Fig. 13 where gear 222 is held in cooperating engagement with the most downward one of gears 220 either by pulling upwards on knob 12 located at the header space or by pressing flexible cable 187 upward in Fig. 10 against the action of compression spring 230. This motion of flexible cable 187 may be produced by shoving control 21 in Fig. 6 to the left or, correspondingly, by stepping on the control knob 21 in Fig. 2. No matter in what manner control rod 223 is moved in the direction of the arrow in Fig. 10, latch bar 235 automatically locks the control rod gear 222 with the gear 220 so that subsequent rotation of knob 12 or control 21 causes a change in the position of stop member 66 and correspondingly causes a change in the tuned condition of the receiver of which coils 55 and 56 form a part.

In this manner, the receiver may be tuned continuously over a range of frequencies by turning knob 12 or control 21 not only for signal reception at that particular instance but also for "setting up" the stations which are sequentially tuned by subsequent operation of the footswitch 19. In this "setting up" process, individual stops 66 are positioned by rotating the turret 67 and stops 66 to a position where they may be moved by sequential axial movement of control rod 223 and rotation of knob 12 or control rod 21.

Fig. 14 shows a modified remote control arrangement for tuning the receiver continuously over a range of frequencies of for "setting up" the stations which are sequentially tuned by subsequent operation of the footswitch 19 in Fig. 4.

In Fig. 14, the apparatus is the same as the apparatus previously described in connection with Figs. 10 and 11, but in addition includes a motor 260 having an axially movable armature for adjusting or varying the position of a stop 66 by energization of such motor either at a point near the receiver or at a point remote from such receiver.

Upon energization of motor 260, its shaft 261 is simultaneously moved in the direction of the arrow in Fig. 14 and rotated so as to initially cause upward movement of control rod 223 into latched position wherein gear 222 engages gear 262 fixed on shaft 261 and is rotated thereby so long as motor 260 is energized with current from source 263 through switch 264.

Motor 260 is mounted upon a bracket 266 which in turn is suitably fastened to a vertical supporting member 211 and carries pivotally mounted actuating member 268. Motor 260 has its armature shaft 261 normally displaced from the position it occupies when motor 260 is energized due to the force exerted by a tension spring 270 having one of its ends attached to bracket 266 and its other end attached to movable actuating member 268.

Actuating member 268 is pivotally mounted on bracket arm 273 by pivoting a pin 274 with its ends fixedly mounted in spaced portions of actuating member 268 and with the body portion of pin 274 extending through a suitably enlarged opening in bracket arm 273.

Actuating member 268 has its upper end in Figs. 14 and 17 pressed into contact with gear 262 on shaft 261 due to the force exerted by tension spring 270 which also normally causes the armature of motor 260 to be displaced from its running position.

Actuating member 268 has its lower end in Figs. 14 and 17 arranged to contact and move the actuating rod 223 when the armature shaft 261 is moved from the position shown in Fig. 14 to the position shown in Fig. 17, in which latter position gear 222 is locked in engagement with gear 220 by means of the latch bar 235 (Fig. 14) as described in connection with Figs. 10 to 13. When gears 220 and 222 are engaged cooperatively by substantial movement of shaft 261 produced by the magnetic pull of the field of motor 260 on its armature, subsequent rotation of motor shaft 261 causes rotation of gear 220, and lateral movement of stop 66 on its threaded shaft 215 whereby carriage 60 is moved laterally to adjust or vary the position of associated tuning elements carried on carriage 60.

In Fig. 14, the switch for actuating motor 260 is shown in general as a single blade switch. Such switch preferably incorporates means for reversing the direction of rotation of shaft 261. Fig. 15 shows such reversing means. The motor 260 having the armature 280 and field winding 281 is arranged to be energized from source 263 through the switch 264. Switch 264, a three-position switch, is shown in open position in Fig. 15 and comprises a single actuating member 284 attached to short-circuiting member 285 and insulating member 286 which carries a pair of insulated contacts connected respectively to opposite terminals of field winding 281.

As actuating member 284 is moved from its first position to a second position in the direction of the arrow in Fig. 15, short-circuiting member 285 conducts current to armature 280 and also current flows from source 263 through shunt connected field winding 281 in one direction. As actuating member 284 is moved further in the same direction, to its third position, current continues to flow to armature 280 in the same direction, but the current flowing in shunt field winding 281 is reversed. Thus, in the first mentioned position of switch 264, the armature 280 is deenergized and in the second position of switch 264 armature shaft 261 (Fig. 14) is moved in the direction of the arrow in Fig. 14 and shaft 261 is rotated in one direction. In the third position, shaft 261 (Fig. 14) is moved in the direction of the arrow in Fig. 14, and shaft 261 rotates in reverse direction.

In the modification shown in Fig. 14, the receiver which is tuned may be located in the header space, trunk or other relatively inaccessible part of an automobile, and in such case switch 264 is conveniently located on the dashboard or floorboard of such automobile. Also, in such case, the actuation of either one of two switches (switch 264 in Fig. 14 and switch 138, 139 in Fig. 6) causes respectively continuous tuning or sequential tuning of the receiver, the stations tuned sequentially being "set up" by actuation of switch 264.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a system for controlling the output volume and tone of a radio receiver in a moving vehicle, means for adjusting over a range such output volume and tone, said means being located for convenient operation by the operator of said vehicle whose attention must be focused upon the operation of said vehicle, second means for adjusting over a range said output volume and tone, said second means being located at a position different from said first means, and means actuated automatically upon adjustment of said second means for transferring control over said output volume and tone from said first means to said second means and for permanently disabling said first means after said adjustment.

2. A volume and tone control system for a signal reproducer comprising means at a first point to adjust over a range the volume of signals and tone reproduced by said reproducer, means at a second point spaced from said first point for adjusting over a range the volume of signals and tone reproduced by said reproducer, and means actuated automatically upon adjustment of one of said means for transferring control over the adjustment of volume of signals and tone reproduced by said reproducer from said one means to the other means, and for permanently disabling said other means after said adjustment.

3. In a control system for a radio receiver in a vehicle, said receiver having means for sequentially selecting predetermined signals and means for muting the output volume of said receiver, the combination of a footswitch located for convenient operation by the vehicle driver while his attention is absorbed in the operation of said vehicle, said footswitch having a member operable in one fashion to cause said muting means to mute the output volume of said receiver and operable further in the same fashion to cause said signal selecting means to select a predetermined signal, said member of said footswitch being operable in a different fashion for adjusting over a range the output volume of said receiver, means located at a position in said vehicle different from said footswitch for consecutively disabling said footswitch to control adjustment of said output volume and thereafter adjusting the volume of output of said receiver, resilient means for resisting movement of said footswitch member when moved in such a direction to cause the muting means to mute the output volume of said receiver and for resisting with sensibly greater resistance after actuation of said muting means further movement of said member to provide an indication by the sense of feel of the position of said footswitch member.

4. In a control system for a radio receiver in a vehicle, said receiver having means for sequentially selecting predetermined signals and means for muting the output volume of said receiver, the combination of a footswitch located for convenient operation by the vehicle driver while his attention is absorbed in the operation of said vehicle, said footswitch having a member operable in one direction to cause said muting means to mute the output volume of said receiver and operable further in the same direction to cause said signal selecting means to select a predetermined signal, said member of said footswitch being operable in a different direction for adjusting over a range the output volume of said receiver, and means located at a position in said vehicle different from said footswitch for consecutively disabling said footswitch to control adjustment of said output volume and thereafter adjusting the volume of output of said receiver.

5. A control for radio receiver mounted in an automobile including an on-off switch, a tone control switch, a combination station-changing, station-muting and volume control means, and means for mounting said switches and control means at a position in said automobile convenient for actuation by the foot of the driver of the automobile.

6. A control for a radio receiver mounted on an automobile including an on-off switch, a tone control switch, a combination station-changing, station-muting and volume control means, such switches and control means being mounted on a unitary structure spacing the switches for actuation by the foot of the driver of the automobile, and station indicating means on the unitary structure.

7. In a radio receiver mounted in an automobile, a station-changing switch mounted on the floorboard of the automobile for convenient operation by the foot of an operator, a housing for said switch, and means carried by said housing for indicating the station setting of said switch.

8. A control for a radio receiver mounted in an automobile including an on-off switch, a tone control switch, a combination station-changing, station-muting and volume control, and a station-setting control, and means for mounting said switches and controls at a position in said automobile convenient for actuation by the foot of an operator.

9. In an automobile receiving system, a receiving set having a plurality of presetable means for presetting said set to receive a signal from any one of a plurality of transmitting stations, a step-by-step rotary selecting device for selecting a desired one of said presetable means, means for rotating said device in steps to select any one of said presetable means, said rotating means including a foot pedal operable by the driver of said automobile, a housing for said foot pedal mounted on the floorboard of the automobile, and means carried by said housing for indicating the particular one of said presetable means selected by said selecting device.

10. In a control system for a radio receiver in a vehicle, said receiver having means for sequentially selecting predetermined signals and means for muting the output volume of said receiver, the combination of a footswitch located for convenient operation by the vehicle driver while his attention is absorbed in the operation of said vehicle, said footswitch having a member operable in one fashion to cause said muting means to mute the output volume of said receiver and operable further in the same fashion to cause said signal selecting means to select a predetermined signal, said member of said footswitch being operable in a different fashion for adjusting over a range the output volume of said receiver, means located in said vehicle at a position different from said footswitch for adjusting over a range the output volume of said receiver, and means at said different positions for transferring control of the adjustment of said output volume from said footswitch to said means.

11. In a radio receiver mounted in an automobile, a station changing switch mounted on the floorboard of the automobile for convenient operation by the foot of an operator, a housing for said switch, an on-off switch for said receiver mounted on said housing, and means carried by said housing for indicating the station setting of said switch.

12. In control apparatus for radio receiving apparatus, a station changing switch mounted on the floorboard of the automobile for convenient operation by the foot of the operator, a housing for said switch, tone control means for said radio receiving apparatus mounted on said housing, and means carried by said housing for indicating the station setting of said switch.

13. In a radio receiver mounted in an automobile, a combination station-changing switch and volume control means mounted on the floorboard of the automobile for convenient operation by the foot of an operator, a housing for said switch, and means carried by said housing for indicating the station setting of said switch.

EUGENE F. McDONALD, JR.

REFERENCES CITED

The following references are of record in the file of this patent:

UNITED STATES PATENTS

| Number | Name | Date |
| --- | --- | --- |
| 1,915,290 | Clement | June 27, 1933 |
| 1,977,745 | Thompson | Oct. 23, 1934 |
| 2,020,420 | Lear | Nov. 12, 1935 |
| 2,028,511 | Lewis | Jan. 21, 1936 |
| 2,047,151 | Mitchell | July 7, 1936 |
| 2,055,363 | Powell | Sept. 22, 1936 |
| 2,062,259 | Thomas | Nov. 24, 1936 |
| 2,078,060 | Clement | Apr. 20, 1937 |
| 2,094,092 | Beers | Sept. 28, 1937 |
| 2,100,609 | Mitchell | Nov. 30, 1937 |
| 2,256,073 | Carlson | Sept. 16, 1941 |
| 2,307,329 | McDonald, Jr. | Jan. 15, 1943 |
| 2,326,737 | Andrews | Aug. 17, 1943 |
| 2,374,873 | McDonald, Jr. | May 1, 1945 |

Certificate of Correction

Patent No. 2,452,384.   October 26, 1948.

EUGENE F. McDONALD, Jr.

It is hereby certified that errors appear in the printed specification of the above numbered patent requiring correction as follows:

Column 12, line 11, for the word "turrest" read *turret*; column 14, line 39, for "frequencies of" read *frequencies or*;

and that the said Letters Patent should be read with these corrections therein that the same may conform to the record of the case in the Patent Office.

Signed and sealed this 1st day of March, A. D. 1949.

[SEAL]

THOMAS F. MURPHY,
*Assistant Commissioner of Patents.*